UNITED STATES PATENT OFFICE.

WILLIAM M. CANFIELD, OF PHILADELPHIA, PENNSYLVANIA.

IMPROVEMENT IN LUBRICATING COMPOUNDS FOR STEAM AND OTHER PACKING.

Specification forming part of Letters Patent No. 110,432, dated December 27, 1870.

*To all whom it may concern:*

Be it known that I, WILLIAM M. CANFIELD, of Philadelphia, county of Philadelphia, State of Pennsylvania, have invented a new and Improved Lubricating Compound; and I do hereby declare that the following is a full, clear, and exact description of the ingredients and proportions used in preparing the same.

To produce my compound, I employ tallow, myrtle-wax, Brazilian wax, beeswax, Japanese wax, German black-lead, American graphite, and asbestus, all combined, or portions of these articles combined, as may be desired, and as will be hereinafter described.

To produce one form of the compound, I take of tallow, four (4) pounds; of myrtle-wax, one-quarter ($\frac{1}{4}$) of a pound; of Brazilian wax, one-quarter ($\frac{1}{4}$) of a pound; of beeswax, one-quarter ($\frac{1}{4}$) of a pound; of Japanese wax, one-quarter ($\frac{1}{4}$) of a pound; of German black-lead, one and one-half ($1\frac{1}{2}$) pound; of American graphite, one and one-half ($1\frac{1}{2}$) pound; of asbestus, one and one-half ($1\frac{1}{2}$) pound.

Another form of the compound is produced by taking of American graphite, four and a half ($4\frac{1}{2}$) pounds; of myrtle-wax, one-quarter ($\frac{1}{4}$) of a pound; of tallow, four (4) pounds; of beeswax, one-quarter ($\frac{1}{4}$) of a pound; of Brazilian wax, one-quarter ($\frac{1}{4}$) of a pound.

A third form of the compound is prepared by using four and one-half ($4\frac{1}{2}$) pounds of German black-lead; one and one-half ($1\frac{1}{2}$) pound of asbestus; one-quarter ($\frac{1}{4}$) of a pound of Japanese wax; one-quarter ($\frac{1}{4}$) of a pound of beeswax, and four (4) pounds of tallow.

Any one of the formulas above described will produce a lubricating compound for steam and hydraulic packing that will prevent cutting of the metal where the packing is applied, and at the same time render the packing pliable, also impervious to the steam or water, and cause it (the packing) to possess great durability.

I do not wish to limit myself to the exact proportions as set forth, as more or less of each of the ingredients enumerated can be used and the same result accomplished.

Having thus described my invention, what I claim, and desire to secure by Letters Patent, is—

1. A lubricating compound composed of tallow, myrtle-wax, Brazilian wax, beeswax, Japanese wax, German black-lead, American graphite, and asbestus, all combined in or about the proportions herein set forth.

2. A lubricating compound composed of American graphite, myrtle-wax, tallow, beeswax, and Brazilian wax, all combined in or about the proportions herein set forth.

3. A lubricating compound composed of German black-lead, asbestus, Japanese wax, tallow, and beeswax, all combined in or about the proportions herein set forth.

In testimony whereof I have hereunto signed my name in the presence of two subscribing witnesses.

WILLIAM M. CANFIELD.

Witnesses:
FRANK STOUT,
JOSEPH EVANS.